US005608706A

United States Patent [19]
Park

[11] Patent Number: 5,608,706
[45] Date of Patent: Mar. 4, 1997

[54] FRONT LOADING DISC PLAYER

[75] Inventor: KwangLim Park, Seoul, Rep. of Korea

[73] Assignee: Daewoo Electronics Co., Ltd., Seoul, Rep. of Korea

[21] Appl. No.: 295,045

[22] Filed: Aug. 26, 1994

[30] Foreign Application Priority Data

Aug. 27, 1993 [KR]   Rep. of Korea ........................ 93-16801

[51] Int. Cl.⁶ ............................ G11B 17/04; G11B 33/02
[52] U.S. Cl. .......................................... 369/77.2; 369/75.2
[58] Field of Search ................................ 369/75.1, 75.2, 369/77.1, 77.2, 36; 360/114

[56] References Cited

U.S. PATENT DOCUMENTS 4,764,917  8/1988  Sugihara et al. ........................ 369/77.1
5,038,331  8/1991  Ogawa ...................................... 369/36
5,237,555  8/1993  Tsuruta et al. .......................... 369/77.2

Primary Examiner—Stuart S. Levy
Assistant Examiner—George J. Letscher
Attorney, Agent, or Firm—Nixon & Vanderhye P.C.

[57] ABSTRACT

A front loading disc player capable of feeding a pickup unit and of loading/unloading a disc with a pickup unit feeding motor is disclosed. The front loading disc player includes a pickup unit having a rack gear portion on an upper end portion, a moving plate, a pickup unit driving mechanism including a plurality of gears and a lead screw, and a disc loading/unloading mechanism including a plurality of gears meshed with the pickup unit and moving plate. Therefore, operations for feeding a pickup unit, and loading and unloading a disc with only a feeding motor can be performed so that the size of the disc player becomes smaller and a number of part needed is reduced to produce the disc player at a lower cost.

2 Claims, 5 Drawing Sheets

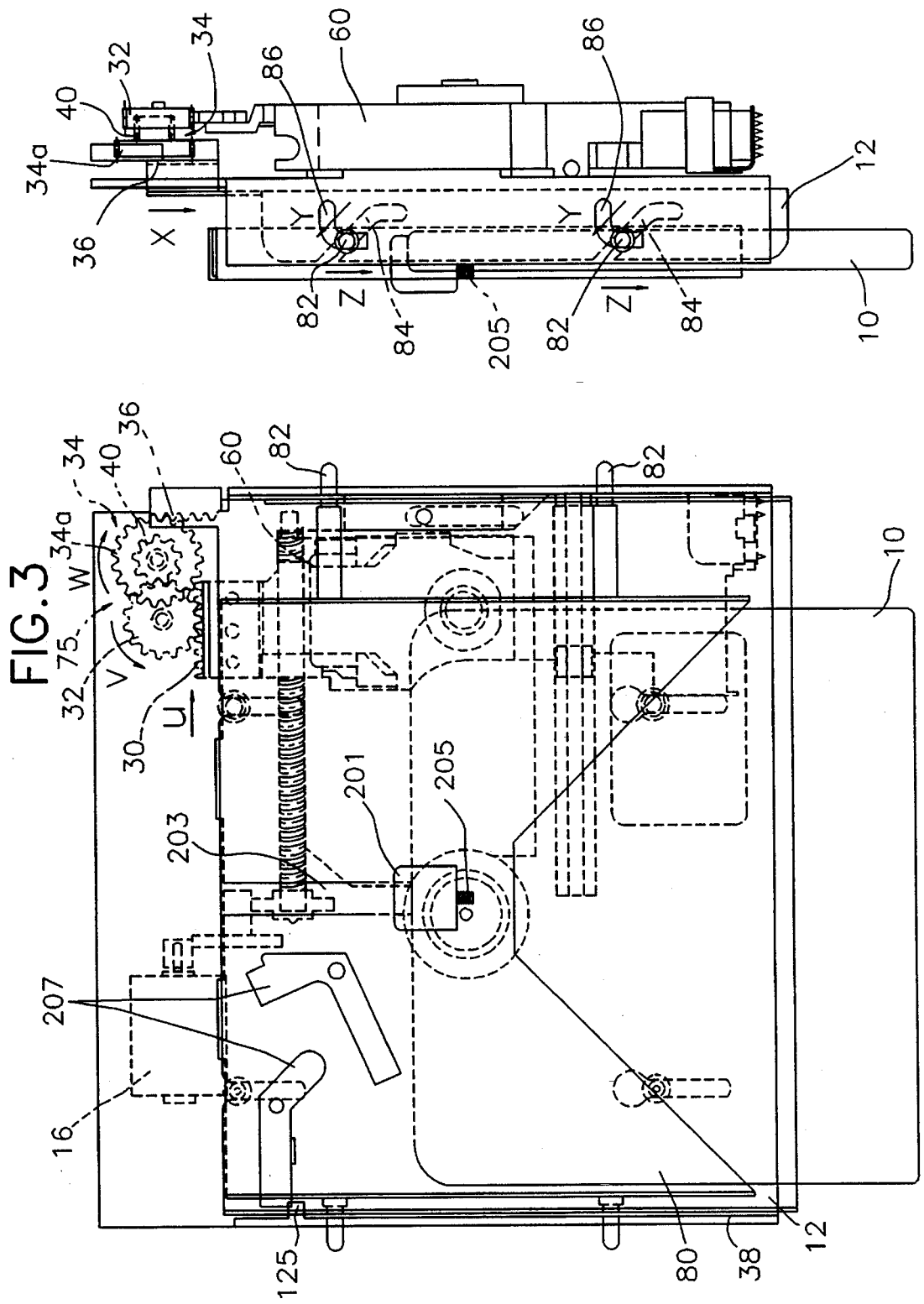

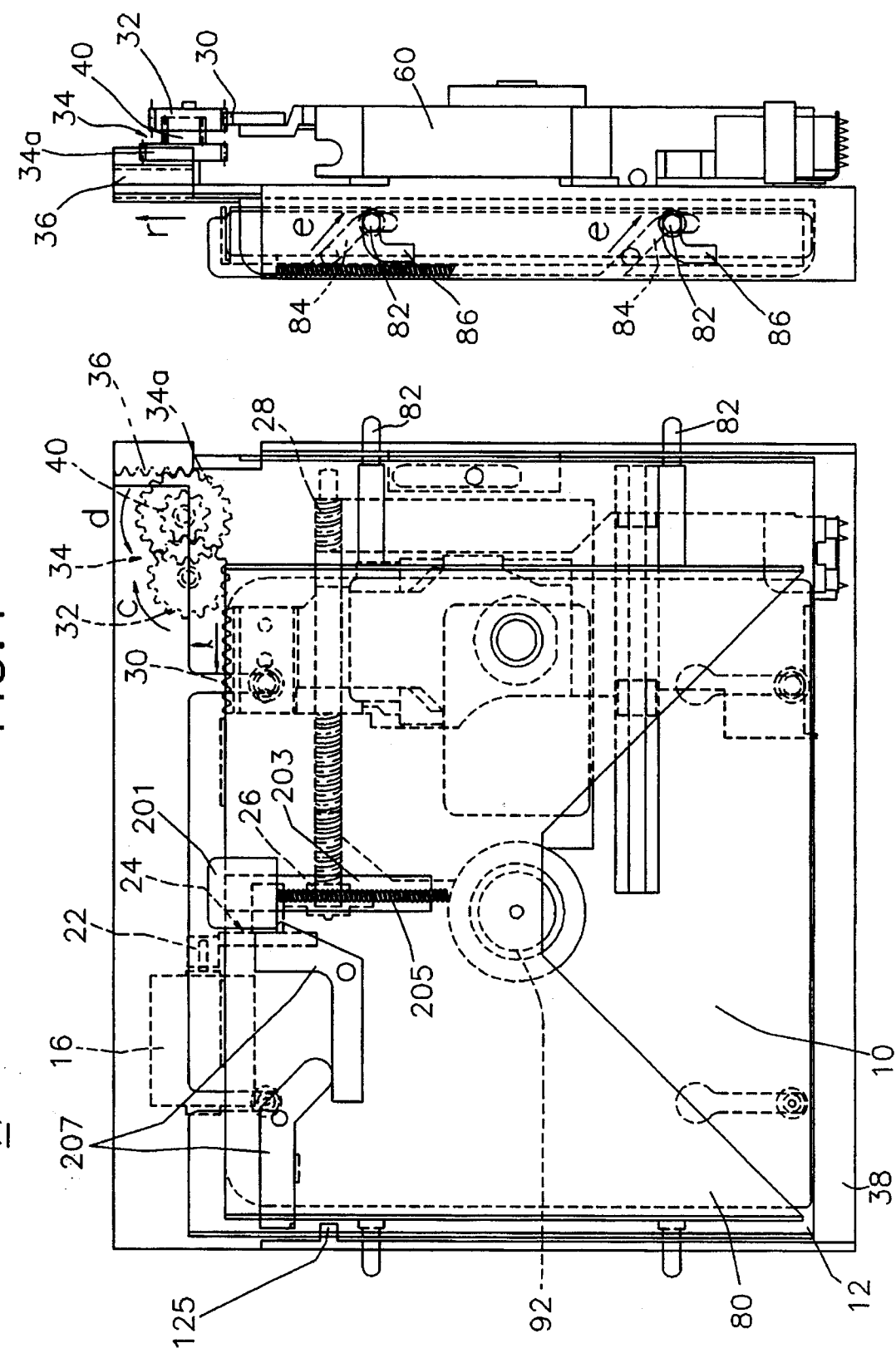

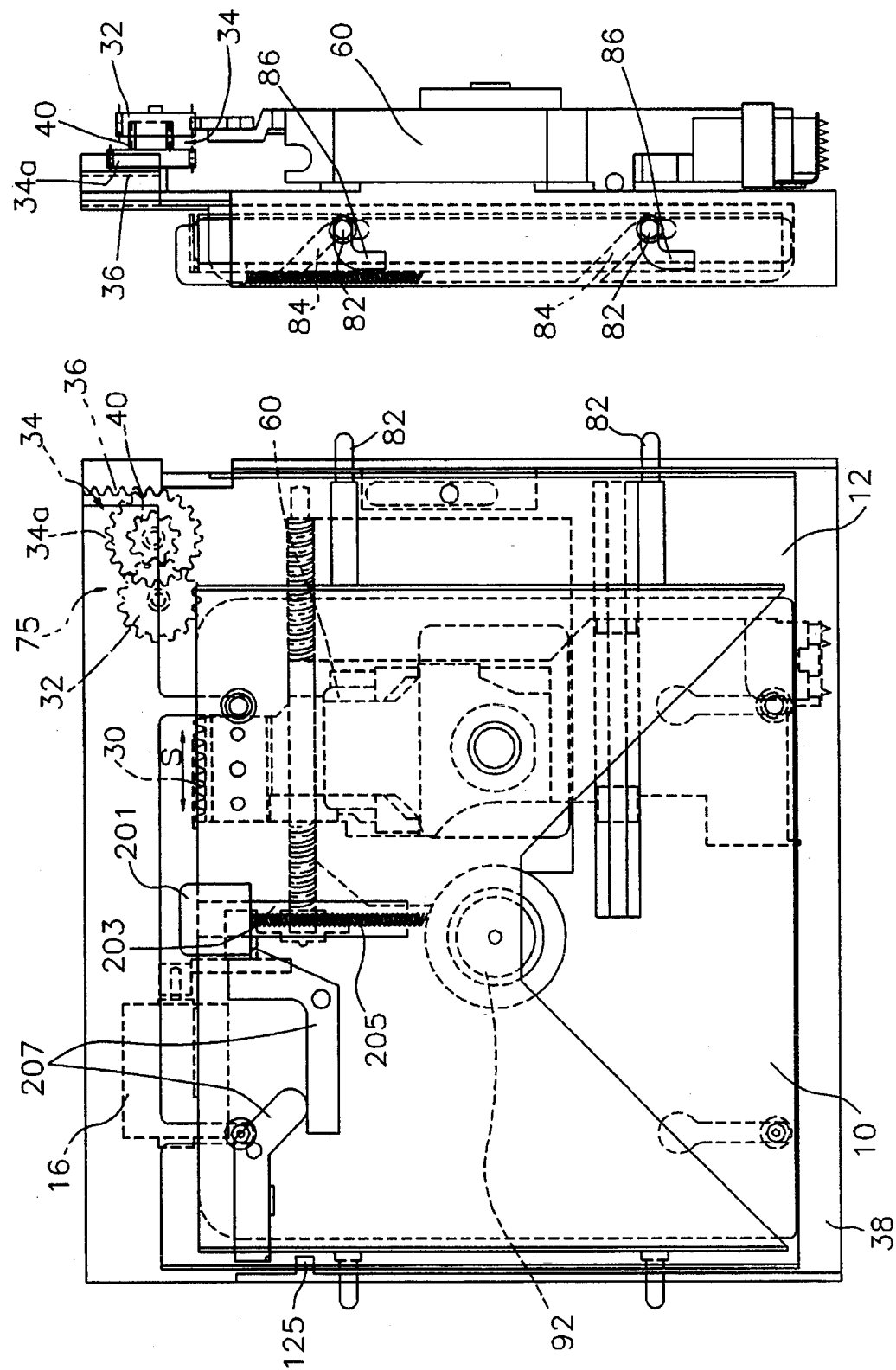

FRONT LOADING DISC PLAYER

BACKGROUND OF THE INVENTION

1. Field of the Invention

The present invention relates to a disc player, more particularly to a front loading disc player capable of feeding a pickup unit and loading a disc with a pickup unit feeding motor.

2. Description of the Prior Art

A front loading disc player is a disc player wherein a disc is inserted from the front panel thereof. The inserted disc is loaded on a turntable by a motor called a loading motor, and reproduced by a pickup unit which is driven by another motor called a feeding motor. FIG. 1 is a diagrammatic view showing an internal structure of a conventional front loading disc player. As shown in FIG. 1, a conventional front loading disc player includes a loading motor 18 providing a driving force for loading and unloading a disc 10 inserted in a tray 80 onto a turntable 92 as a moving plate 12 having a rack portion (not shown) is travelled frontwards and backwards in a deck 14, and a feeding motor 16 feeding a pickup unit 60 in order to reproduce information recorded on disc 10 which is loaded on turntable 92. The driving force of loading motor 18 is transmitted to moving plate 12 through a driving force transmitting unit 5 constructed with a plurality of gears. Also, a driving force of feeding motor 16 is transmitted to pickup unit 60 through a lead screw 28 meshed with pickup unit 60.

Reference numeral 38 denotes a base of the disc player.

That is, since such a conventional front loading disc player needs loading motor for loading and unloading a disc and a driving force transmitting unit for transmitting a driving force of the loading motor, there exists drawbacks in that the size of the disc player becomes large as well as a product cost increases due to more necessary parts needed.

SUMMARY OF THE INVENTION

An object of the present invention is to provide a front loading disc player capable of feeding a pickup unit and of loading a disc with a pickup unit feeding motor.

In order to attain the above object, a front loading disc player according to present invention comprises a pickup unit having a rack gear portion on an upper end portion;

a moving plate having a rack gear portion formed on an outer side of a rear portion thereof;

a pickup unit driving mechanism including a feeding motor for feeding the pickup unit, a shaft gear fixed to a shaft of the feeding motor, a first double gear having a first wheel gear portion meshed with the shaft gear and a first pinion gear portion formed in one body with the first wheel gear portion and in a smaller diameter compared to the first wheel gear portion, a first wheel gear having a circular center groove and meshed with the first pinion gear portion, and a lead screw meshed with the pickup unit and whose one end is fixed to the center groove of the first wheel gear so as to feed the pickup unit in accordance with a rotation of the first wheel gear; and a disc loading/unloading mechanism including a second wheel gear meshed with the rack gear portion of the pickup unit and a second double gear having a second wheel gear portion meshed with the rack gear portion of the moving plate and a second pinion gear portion formed in one body with the second wheel gear portion and in a smaller diameter compared to the second wheel gear portion and meshed with the second wheel gear.

BRIEF DESCRIPTION OF THE DRAWINGS

The above objects and other advantages of the present invention will become more apparent by describing in detail a preferred embodiment thereof with reference to the attached drawings in which;

FIG. 3 is a view showing disc insertion and ejection operations in one embodiment of a front loading disc player according to the present invention;

FIG. 4 is a view showing a disc loading operation in one embodiment of a front loading disc player according to the present invention; and FIG. 5 is a view showing a disc reproducing operation in one embodiment of a front loading disc player according to the present invention.

DESCRIPTION OF THE PREFERRED EMBODIMENT OF THE INVENTION

Figure 1:
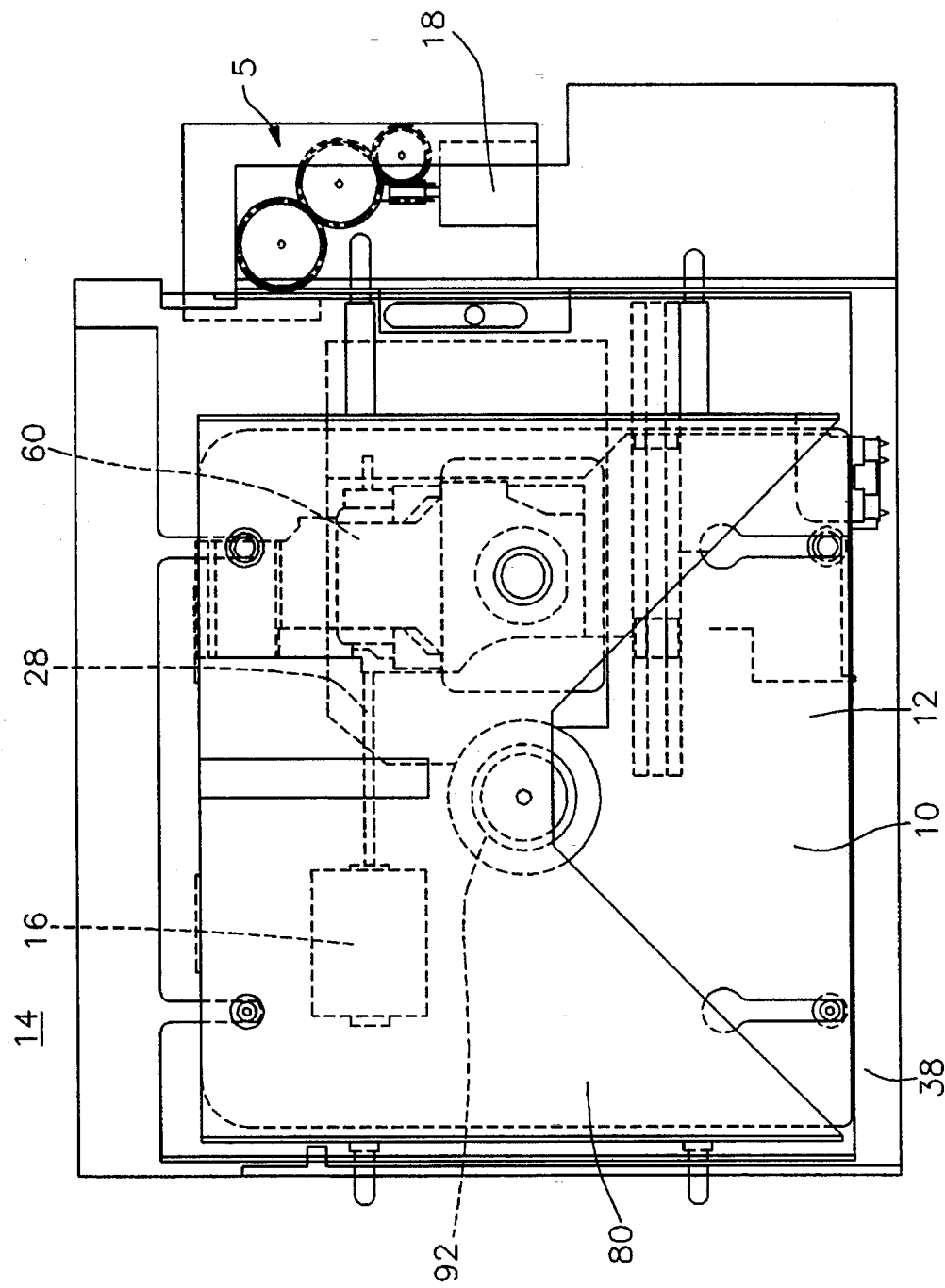
FIG. 1 is a diagrammatic view showing an interior structure of conventional front loading disc player.
Figure 2:
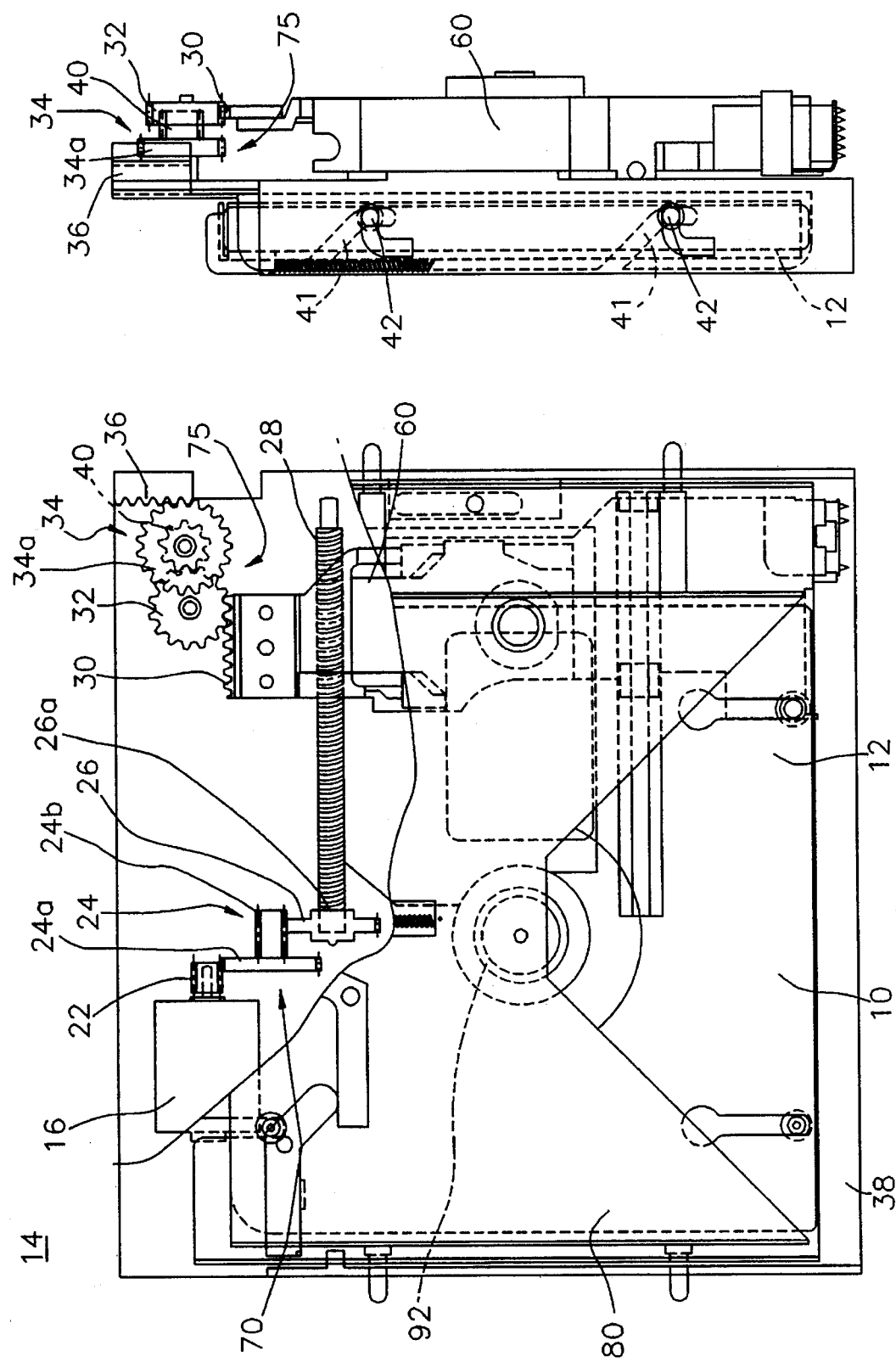
FIG. 2 is a view showing an interior structure of one embodiment of a front loading disc player according to the present invention.

FIG. 2 is a view showing an interior structure of one embodiment of a front loading disc player according to the present invention.

As shown in FIG. 2, in a front loading disc player performing disc loading and unloading operations of a disc inserted in a tray in accordance with frontward and backward traveling operations of a moving plate having a rack gear portion, a front loading disc player according to one embodiment of the present invention includes a pickup unit 60 having a rack gear portion 30 on an upper end portion; a moving plate 12 having a rack gear portion 36 formed on an outer side of a rear portion thereof; a pickup unit driving mechanism 70 including a feeding motor 16 for feeding pickup unit 60, a shaft gear 22 fixed to a shaft of feeding motor 16, a first double gear 24 having a first wheel gear portion 24a meshed with shaft gear 22 and a first pinion gear portion 24b formed in one body with wheel gear portion 24a and in a smaller diameter compared to wheel gear portion 24a, a first wheel gear 26 having a circular center groove 26a and meshed with first pinion gear portion 24b of first double gear 24, and a lead screw 28 meshed with pickup unit 60 and whose one end portion is fixed to center groove 26a of first wheel gear 26 so as to feed pickup unit 60 in accordance with a rotation of first wheel gear 26; and a disc loading/unloading mechanism 75 including a second wheel gear 32 meshed with rack gear portion 30 of pickup unit 60 and a second double gear 34 having a second wheel gear portion 34a meshed with rack gear portion 36 of moving plate 12 and a second pinion gear portion 40 formed in one body with second wheel gear portion 34a and in a smaller diameter compared to second wheel gear portion 34a and meshed with second wheel gear 32. Operations of a front loading disc player according to one embodiment of the present invention will be described hereunder in detail with reference to accompanying drawings.

FIG. 3 is a view showing disc insertion and ejection operations in one embodiment of a front loading disc player according to the present invention. As shown in FIG. 3, a disc 10, which carries information, is inserted into a tray 80 for reproduction. The inserted disc 10 is met with a disc stopper 201 which moves along a longitudinal groove 203 formed on an upper side of tray 80. At this time, a feeding motor 16 is not driven, a rack gear portion 30 of a pickup unit 60 positioned outside disc 10 is kept meshed with a second wheel gear 32. A second wheel gear 32 is meshed with a second pinion gear portion 40 of a second double gear 34, and a second wheel gear portion 34a of second double gear 34 is meshed with a rack gear portion 36 of a moving plate 12. Also, protrusions 82 formed on tray 80 are positioned on an upper front portion of guide openings 86 of a chassis 39 through cam holes 84 of moving plate 12.

FIG. 4 is a view showing a disc loading operation in one embodiment of a front loading disc player according to the present invention.

As shown in FIG. 4, when a disc 10 is completely inserted in a tray 80, a disc stopper 201 is pushed inside tray 80 along a longitudinal groove 203 formed on a upper side of tray 80. Inwards pushed disc stopper 201 is supported by a disc stopper support members 207. At this time, disc stopper 201 is receiving an elastic force of a spring 205 in a disc pushing-out direction. With this state, a feeding motor 16 is driven. A driving force of feeding motor 16 drives a lead screw 28 through a shaft gear 22, a first double gear 24, and a first wheel gear 26. A pickup unit 60 is fed toward the center of disc 10 by the driving force of feeding motor 16 (arrow 1 direction). Therefore, a second wheel gear 32 meshed with a rack gear portion 30 of pickup unit 60 is rotated in a clockwise direction (arrow c direction), and a second pinion gear portion 40 of a second double gear 34 meshed with second wheel gear 32 is rotated in a counter-clockwise direction (arrow d direction). Accordingly, a second wheel gear portion 34a of second double gear 34, which is meshed with a rack gear portion 36 of a moving plate 12, is also rotated in a counterclockwise direction so that moving plate 12 is traveled rearwards (arrow r direction). Therefore, protrusions 82 of tray 80 move along cam holes 84 of moving plate 12 (arrow e direction), and tray 80 is traveled toward a turntable 92 so that disc 10 inserted in tray 80 is loaded on turntable 92.

FIG. 5 is a view showing a disc reproducing operation in one embodiment of a front loading disc player according to the present invention.

As shown in FIG. 5, a pickup unit 60 is traveled leftwards and rightwards by a driving force of a feeding motor 16 in order to play back information recorded on a disc 10 (double arrow s direction). In such a playing back operation, as shown in FIG. 5, since a rack gear portion 30 of pickup unit 60 is not meshed with a second wheel gear 32, disc 10 is kept loaded on turntable 92. When finishing a playing back operation as shown in FIG. 3, pickup unit 60 is moving toward second wheel gear 32 by feeding motor 16 (arrow u direction). At the time rack gear portion 30 of pickup unit 60 is meshed with second wheel gear 32, second wheel gear 32 is rotated in a counterclockwise direction (arrow v direction). Therefore, a second pinion gear portion 40 of a second double gear 34, which is meshed with second wheel gear 32, is rotated in s clockwise direction (arrow w direction). And a second wheel gear portion 34a of second double gear 34, which is meshed with a rack gear portion 36 of a moving plate 12, is rotated in a clockwise direction (arrow w direction) so that moving plate 12 travels frontwards (arrow x direction). According to this, protrusions 82 of a tray 80 is travelled up along cam holes 84 of moving plate 12 (arrow y direction) and pushed frontwards along a guide groove 86 of a chassis 39, so that tray 80 causes an eject stopper 125 to be operated to release a support of disc stopper support members 207 to a disc stopper 201. With such a releasing, disc stopper 201, which is carrying an elastic force of a spring 205, pushes disc 10 frontwards in order for disc 10 to be ejected.

In the meantime, a ratio of a rotation number of a second wheel gear 32 with respect to that of a second pinion gear portion 40 is predetermined by teeth formed on respective gear 32 and 40 in order for second pinion gear portion 40 to be rotated much faster than second wheel gear 32 is, so that a rotation number of second double gear 34 becomes larger compared to that of second wheel gear 32. That is, a ratio of a rotation number of second pinion portion 40 of second double gear 34 with respect to that of second wheel gear 32 is made larger than 1. With the ratio made, a small rotation number of second wheel gear 32 causes moving plate 12 to be travelled with a longer distance.

As mentioned above, a front loading disc player according to the present invention performs operations for feeding a pickup unit, and loading and unloading a disc with only a feeding motor so that the size of the disc player becomes smaller and a number of parts needed is reduced to produce the disc player at a lower cost.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A front loading disc player performing loading/ejecting operations of a disc inserted in a tray, said front loading disc player comprising;

a pickup unit having a rack gear portion on an upper end portion for playing back said disc, said pickup unit being fed by a lead screw;

a moving plate having a rack gear portion formed on an outer side of a rear portion thereof, said moving plate traveling rearwards and frontwards;

a pickup unit driving means including a feeding motor for feeding said pickup unit, a shaft gear fixed to a shaft of said feeding motor, a first double gear having a first wheel gear portion meshed with said shaft gear and a first pinion gear portion formed in one body with said first wheel gear portion and in a smaller diameter compared to said first wheel gear portion, a first wheel gear having a circular center groove and meshed with said first pinion gear portion, and a lead screw meshed with said pickup unit and whose one end is fixed to said center groove of said first wheel gear so as to feed said pickup unit in accordance with a rotation of said first wheel gear; and a disc loading/unloading means including a second wheel gear meshed with said rack gear portion of said pickup unit and a second double gear having a second wheel gear portion meshed with said rack gear portion of said moving plate and a second pinion gear portion formed in one body with said second wheel gear portion and in a smaller diameter compared to said second wheel gear portion and meshed with said second wheel gear, wherein said rack gear portion of said pickup unit is meshed with said second wheel gear only while a disc is loaded and unloaded, and said rack gear portion of said moving plate is normally meshed with said second wheel gear portion of said second double gear.

2. The front loading disc player as claimed in claim 1, wherein a ratio of a rotation number of said second pinion portion of said second double gear with respect to that of said second wheel gear is larger than 1.

* * * * *